(12) United States Patent
Wendt

(10) Patent No.: US 10,973,105 B2
(45) Date of Patent: Apr. 6, 2021

(54) LIGHTING DEVICE WITH CONTROL OF POWER FLOW DIRECTION

(71) Applicant: SIGNIFY HOLDING B.V., Eindhoven (NL)

(72) Inventor: Matthias Wendt, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/631,372

(22) PCT Filed: Jul. 12, 2018

(86) PCT No.: PCT/EP2018/069023
§ 371 (c)(1),
(2) Date: Jan. 15, 2020

(87) PCT Pub. No.: WO2019/016085
PCT Pub. Date: Jan. 24, 2019

(65) Prior Publication Data
US 2020/0221559 A1 Jul. 9, 2020

(30) Foreign Application Priority Data
Jul. 19, 2017 (EP) ..................................... 17182073

(51) Int. Cl.
*H05B 47/14* (2020.01)
*H02J 7/00* (2006.01)
*H02J 7/34* (2006.01)

(52) U.S. Cl.
CPC ............ *H05B 47/14* (2020.01); *H02J 7/0048* (2020.01); *H02J 7/0068* (2013.01); *H02J 7/342* (2020.01)

(58) Field of Classification Search
CPC .. H05B 45/10; H05B 47/11; H02J 7/00; H02J 7/0063; H02J 7/0069
See application file for complete search history.

(56) References Cited

U.S. PATENT DOCUMENTS 9,431,842 B1 8/2016 Noble, Jr. et al.
10,211,661 B2 * 2/2019 Kim ..................... G01R 31/385
(Continued)

FOREIGN PATENT DOCUMENTS

EP 3007311 A2 4/2016
WO 2014089068 A1 6/2014

OTHER PUBLICATIONS

Stacy Liberatore, for dailymail.com, "Low Battery? No problem! PowerShare Lets You Wirelessly Share Your Battery to Charge a Friend's Phone", Published May 20, 2016, pp. 1-17.

*Primary Examiner* — Daniel D Chang

(57) ABSTRACT

A lighting device (100), comprising a light source (104) configured to be driven by electrical power, an energy-storage unit (106) configured to store electrical energy, to receive the electrical power from a power interface and to deliver the electrical power to the light source and to the power interface (108) allowing, in a connected state, an energy-transfer operation between the energy-storage unit (106) and an external second energy-storage unit (110) of an external electrically driven device (102) that can be connected to the power interface (108) and a control unit (116) configured to determine if the power interface (108) is in the connected state, to determine a current light-output state of the lighting device (100), and to control, in the connected state, the energy-transfer operation in an energy-transfer direction depending on the current light-output state of the lighting device (100).

15 Claims, 4 Drawing Sheets

(56) References Cited

U.S. PATENT DOCUMENTS

| | | | |
|---|---|---|---|
| 2013/0043831 A1* | 2/2013 | Hu | H02J 7/0068 320/107 |
| 2013/0154551 A1* | 6/2013 | Jeansonne | H02J 7/00 320/107 |
| 2014/0089068 A1 | 3/2014 | Yehezkel et al. | |
| 2017/0060207 A1 | 3/2017 | Backman et al. | |

* cited by examiner ent application is the U.S. National Phase application under 35 U.S.C. § 371 of International Application No. PCT/EP2018/069023, filed on Jul. 12, 2018, which claims the benefit of European Patent Application No. 17182073.1, filed on Jul. 19, 2017. These applications are hereby incorporated by reference herein.

LIGHTING DEVICE WITH CONTROL OF POWER FLOW DIRECTION

CROSS-REFERENCE TO PRIOR APPLICATIONS

This application is the U.S. National Phase application under 35 U.S.C. § 371 of International Application No. PCT/EP2018/069023, filed on Jul. 12, 2018, which claims the benefit of European Patent Application No. 17182073.1, filed on Jul. 19, 2017. These applications are hereby incorporated by reference herein.

FIELD OF THE INVENTION

The present invention related to a lighting device, a method for operating a lighting device, a power distribution system comprising a lighting device and to a computer program.

BACKGROUND OF THE INVENTION

US 2017/0060207 A1 describes a bi-directional transfer of energy, in which a user of a portable device such as a Smartphone, speaker, tablet or watch defines a charging direction when two devices with bi-directional energy transfer interfaces are interconnected. The device detects a gesture of the user and starts the energy transfer to the defined direction. The user may also define the amount of charge to be transferred by the same gesture.

EP 3007311 A2 discloses an electronic device which includes a connection terminal to which a charging cable or a discharging cable can be connected, and a controller configured to control a charging or discharging operation based on the charging cable or the discharging cable being connected to the connection terminal.

SUMMARY OF THE INVENTION

It would be desirable to enable a lighting device to be part of a power distribution system without requiring user input for controlling the energy-transfer operation. According to a first aspect of the present invention, a lighting device comprises:

a light source configured to be driven by electrical power;

a power interface for energy transfer with an external electrically driven device that can be connected to the power interface;

an energy-storage unit configured to receive electrical power via the power interface, to store received electrical power as electrical energy, and to deliver stored electrical energy to the light source as the electrical power and to the power interface and to allow, in a connected state, an energy-transfer operation between the energy-storage unit and an external second energy-storage unit of the external electrically driven device via the power interface;

a control unit configured to determine if the power interface is in the connected state, to determine a current light-output state of the lighting device, and to control, in the connected state, the energy-transfer operation in an energy-transfer direction depending on the current light-output state of the lighting device.

The lighting device of the first aspect of the invention achieves an intuitive control of energy-transfer for a lighting device in situations where the lighting device needs to be charged or is able to provide energy for charging an external electrically driven device, such as for instance a power bank.

In essence, available light-output states in the lighting device are used to make a preselection of the energy-transfer direction. To this end, the lighting device of the first aspect of the present invention comprises a light source that is driven by electrical power to emit light when receiving a sufficient amount of electrical power for this operation. The light source thus performs a lighting function, that is, a functional or decorative illumination of the surroundings of the lighting device. The light source may comprise one or more light emitters. The electrical power for operating the light source and thus performing the lighting function is delivered by an energy-storage unit of the lighting device that is configured to store electrical energy.

In addition to its lighting function, that is, simultaneously with or alternatively to performing the lighting function, the lighting device allows an energy-transfer operation between the lighting device and an external electrically driven device. To this end, the energy-storage unit is also connected to a power interface of the lighting device to allow the energy-transfer operation between the energy-storage unit and an external second storage unit of the external electrically driven device via the power interface. The lighting device allows a bidirectional energy-transfer, i.e., either receiving energy from an external second energy-storage unit or for delivering energy to the external second energy-storage unit. A control unit determines if the external electrically driven device is currently connected to the power interface, i.e., whether the power interface is in a connected state. The control unit is also configured to determine a current light-output state of the lighting device. Upon detecting the connected state, the control unit controls the energy-transfer direction of the energy-transfer operation in dependence on a current light-output state of the lighting device. The light-output state is an operational state of the light source of the lighting device that can be represented by one or more operational parameters indicative of one or more quantities describing a current light output by the light source. Therefore, the energy-transfer operation can be controlled automatically by the control unit on the basis of determining the current light-output state of the lighting device.

In the following, embodiments of the lighting device of the first aspect of the present invention will be described.

There are different quantities and conditions that can be used to determine the energy-transfer direction, i.e., between power input mode or power output mode, in dependence on the light-output state of the lighting device, as will be described in the following. Such quantities and conditions can be used either alone or in combination with each other.

Different embodiments are configured to control the energy-transfer operation and its direction depending on different types of light-output states. In some of these embodiments described in more detail in the following, it is nothing but the light-output state that is used to select between power reception and power delivery in regard to the energy-transfer direction. In other embodiments, other parameters and associated control criteria are used in combination with the control criterion associated with the light-output state for determining the direction of energy transfer, as will be described further below.

In one group of embodiments, the control unit of the lighting device is configured to determine the current light-output state of the lighting device using a determination of a current control state associated with the light source. In some examples, a set of current control states that can be assumed by the lighting device comprises or consists of an off-state and an on-state. The off-state results a light-output state where no electrical power is delivered from the energy-storage unit to the light source, so that the light source does not emit light. The on-state is a light-output state where the light source is driven to emit light using the energy stored in the energy-storage unit.

The control unit used in some variants of this group of embodiments comprises a power delivery detector configured to detect the on-state by detecting a delivery of electrical power from the energy-storage unit to the light source. The power delivery detector is for instance configured to detect a flow of electrical current from the energy-storage unit to the light source. Another example of a power delivery detector is configured to determine a switching state of a power switch for turning power delivery to the light source on or off. Such a power switch can be provided for user operation, or for internal automatic control, or for allowing both, user operation and automatic control. Yet another power-delivery detector that can be used in the control unit comprises a light sensor configured to determine if the light source is currently emitting light. To this end, the light sensor is preferably arranged suitably in order to allow detection of light emitted by the light source of the lighting device and avoid detection of light from external light sources. A suitable arrangement can for instance involve a shielding of the light sensor from ambient light.

The control unit of this group of embodiments is configured to set a first energy-transfer direction from the energy-storage unit to the external second energy-storage unit in case the current output state is the on-state, and to set a second energy-transfer direction from the second energy-storage unit to the energy-storage unit in case the current output state is the off-state.

In other words, transfer of electrical energy is controlled in a direction from the energy-storage unit to the second energy-storage unit of the external electrically driven device when the light source is on (i.e., it is emitting light), and to receive electrical energy from the second energy-storage unit of the external electrically driven device when the light source is off (i.e. it is not emitting light). An operational state of the external electrically driven device is not taken into account in some of these embodiments. For instance, a mobile phone forming the external electrically driven device may thus be on or off while the energy transfer is taking place.

Alternative embodiments of this kind control the energy-transfer direction in an opposite way. The control unit of such embodiments is configured to set a first energy-transfer direction from the energy-storage unit to the second energy-storage unit in case the current light-output state is the off-state, and to set a second energy-transfer direction from the second energy-storage unit to the energy-storage unit in case the current light-output state is the on-state. These embodiments are thus configured to transfer electrical energy from the energy-storage unit to the second energy-storage unit of the external electrically driven device when the light source is off, and to receive electrical energy from the second energy-storage unit of the external electrically driven device when the light source is on.

In other embodiments, the control unit determines the current light-output state of the lighting device from a quantity indicative of a current light intensity value of the light emitted by the light source. In these embodiments, the light source is configured to emit light having a controllable light-intensity value. Suitably, a light-intensity controller is provided in the lighting device in these embodiments to control the operation of the light source to achieve a desired light-intensity value. The different light-intensity values can include a continuous intensity-value range or number of discrete light-intensity values. The light-intensity controller can to this end for example comprise a potentiometer or other circuitry for setting a desired light-intensity value. The control unit of these embodiments determines the current light-intensity value as the light-output state.

To this end, the control unit of different variants of this embodiment is configured to determine the current light-intensity value, for instance from a setting of a light-intensity controller provided in the lighting device, or by measuring electrical current delivered to the light source or by measuring an amount of light emitted by the light source using, for example, a photo detector. The control unit is further configured to set the first energy-transfer direction from the energy-storage unit to the second energy-storage unit in case the determined current light-intensity value is within a predetermined first light-intensity interval, and to set the second energy-transfer direction from the second energy-storage unit to the energy-storage unit in case the determined current light-intensity value is within a predetermined second light-intensity interval that is different from the first light-intensity interval.

In these embodiments, the variable light-intensity value can be set using a dimming factor, and the energy-transfer operation and the energy-transfer direction is thus controlled in dependence on a predetermined dimming factor value or interval. The dimming factor corresponds to a ratio of the actual light-intensity value and a predetermined maximum light-intensity value, and thus covers a value range between 0 and 1, or between 0% and 100%. As a non-limiting example, the control unit of some embodiments is configured to control the energy-transfer so as to provide electrical energy to the second energy-storage unit of the external device when the current light-intensity value is above 25% of the maximum value (i.e., dimming factor above 0.25 or 25%), and so as to receive electrical energy from the external second energy-storage unit when the light-intensity value is equal to or lower than 25%. Of course, other non-overlapping intervals of light-intensity values and associated energy-transfer directions can be implemented to form other embodiments.

In other embodiments the control unit is configured to determine the light-output state in the form of a current light-color value of the light emitted by the light source. In these embodiments the light source comprises a plurality of lighting elements that are configured to emit light with respective different wavelength spectra and with individually controllable respective light-intensity values. In some embodiments, the light source suitable comprises three different sets of lighting elements configured to emit light with three different colors that added together with respective controllable intensities can reproduce a broad spectrum of colors, including white light. A set of lighting elements emitting light with a respective color can comprise one or more lighting elements, according to the requirements of a given lighting application.

Suitable embodiments make use of light emission and control based on an RGB color model in which the different sets of lighting elements emit red, green and blue light, respectively. Another embodiment uses lighting elements providing respective light emission in the colors cyan, magenta and yellow. In these embodiments, the control unit is configured to determine as the light-output state a current light-color value using the respective current light-intensity values of the different sets of lighting elements, and to set, in the connected state, the energy-transfer direction in dependence on the current light-color value.

This way, for instance, a detection of a night lighting mode of the lighting device, when the light emission from the lighting device is in a predefined red color, can be used to control energy transfer to the external second energy-storage unit in the connected state.

The control unit of some of these embodiments is additionally configured to detect and distinguish one or more ambient lighting conditions, for instance using a detected intensity or color of ambient light, and to control the intensity and/or the color of the light emitted by the light source in dependence on the detected ambient lighting condition. This in turn allows an automatic control, as explained, of the energy-transfer operation and in particular the energy-transfer direction in additional dependence on ambient lighting conditions. That is, the ambient lighting conditions form an additional input that in addition to the current light-output state is used for control of the energy-transfer operation.

For instance, a low intensity of ambient light can be used as an additional indication and thus confirmation of operation during night time.

In other embodiments of the lighting device, the control unit is additionally configured to determine an energy-storage level indicative of an amount of electrical energy stored in the energy-storage unit. The control unit of these embodiments is furthermore additionally configured to control, in the connected state, the energy-transfer operation in additional dependence on the energy-storage level. The energy-storage level is in some of these embodiments determined as an indicator of a relative amount of stored energy with respect to a predetermined maximum energy storage capacity of the energy-storage unit. In other embodiments it is determined as an energy amount in absolute numbers. As a non-limiting example, the control unit can thus advantageously trigger an energy-transfer operation of electrical energy from the energy-storage unit to the second energy-storage unit of the external electrically driven device only when the energy stored in the energy-storage unit is determined to be above a predetermined threshold value. Thus the energy-transfer operation to the second energy-storage unit is blocked at energy-storage levels below the threshold value even if the light-output state alone is in favor of triggering the energy-transfer operation in that direction. In another example, the control unit advantageously allows an energy-transfer operation of electrical energy to charge the energy-storage unit using energy provided by the second energy-storage unit of the external electrically driven device only when the energy stored in the energy-storage unit is below a predetermined threshold value. This way, while based alone on the light-output state driven control an unnecessary attempt to charge the energy-storage unit would be made, such unnecessary attempt can be avoided in the present embodiment.

Other embodiments of lighting devices further comprise a user interface configured to receive user input and to provide a user input signal indicative thereof. In these embodiments the control unit is further configured to receive the user input signal and to control, in the connected state, the energy-transfer operation in additional dependence on the received user input signal. In some variants, these embodiments advantageously enable an external user to set control rules for control of the energy-transfer operation based on the current light-output state, and optionally further based on additional state parameters such as the energy-storage level parameters for instance, by a user input selecting one or more control rules from a prestored number of control rules.

In some embodiments the user interface comprises a switch or a button panel configured to be operated by the user.

In other embodiments, the user interface comprises a tilt sensor that is configured to generate the user input signal as a tilt signal indicative of a tilting angle that the lighting device currently assumes with respect to a predetermined upright position. The control unit is configured receive the tilt signal and to start, in the connected state, the energy-transfer operation upon determining that the tilting angle has been in a predetermined first angular interval for a predetermined first time span, and to stop the energy-transfer operation upon determining that the tilting angle has been in a predetermined second angular interval for a predetermined second time span. The first and second angular intervals are preferably selected to enable an intuitive control of the energy-transfer operation by, for example, mimicking gestures involved in pouring liquid from one container to another. The tilt sensor suitably comprises one or more acceleration sensors. In a particular advantageous embodiment using three acceleration sensors, the tilt sensor is configured to generate the user input signal as a tilt signal in terms of a three reference axes defining a three-dimensional coordinate space.

In other embodiments, the control unit is further configured to control the light source to provide an output indicative of the current energy-transfer direction. These embodiments can advantageously provide a feedback to a user regarding a current status of an energy-transfer operation. In some exemplary embodiments, the light source is configured to blink according to a predetermined blinking pattern identifying the current energy-transfer direction. In other embodiments, the control unit is configured to provide the output indicative of the current energy-transfer direction in the form of controlling the light source to emit light with a predetermined light-intensity or with a predetermined color. For example, the color may be changed in predefined steps from red to green or from warm white to cold white in correspondence to the energy-storage unit of the lighting device gradually changing from an empty to a full state. This way, the light output can be modulated to provide feedback on either the power redistribution relationship or the charging status.

According to a second aspect of the present invention, a power distribution system is presented. The power distribution system comprises:
 a lighting device according to the first aspect of the present invention or one of its embodiments;
 an electrically driven device, comprising:
  a second power interface configured to be connected to the power interface of the lighting device;
  a second energy-storage unit connected to the second power interface and configured to store electrical energy and to deliver electrical power to the lighting device and receive electrical power from the lighting device; and
 an energy-transfer means configured to electrically connect to the power interface of the lighting device and to the second power interface of the electrically driven device to enable the energy-transfer operation between the energy-storage unit of the lighting device and the second energy-storage unit of the electrically driven device.

The power distribution system of the second aspect shares the advantages of the lighting device of the first aspect and of any of its embodiments. In particular, the power distribution system enables energy transfer between the lighting device and the electrically driven device in dependence on the current light-output state of the lighting device.

Both the lighting device and the electrically driven device are configured to deliver and receive electrical power. These two operational modes are however not performed simultaneously by neither the lighting device nor the electrically driven device. The control unit of the lighting devices controls the energy-transfer operation in an energy transfer direction (i.e., which of the two devices—lighting device or electrically driven device—is delivering and which of the two devices is receiving the electrical power) depending on the current light-output state of the lighting device.

In one embodiment, the power distribution system comprises a second lighting device as the electrically driven device. The second lighting device is connected to the lighting device via the energy-transfer means.

The use of a cable with connectors at both ends as the energy-transfer means is suitable in many application scenarios, but not a requirement. A suitable energy-transfer means can also make use of a connection via a suitably made circuit board instead of a cable. The energy can then be conducted via printed conductor paths. The first and second power interfaces may comprise plug-and-socket-type connectors. This has the advantage of allowing a user to connect the lighting device and the electrically driven device only when required, in particular for energy-transfer, and to operate these devices separately from each other at other times. However, in other application cases, the connection between the lighting device and the electrically driven device via the power interface can be achieved as a fixed connection Separation of a fixed connection requires technical expertise that goes beyond the skill of an average user of the lighting device.

In some embodiments of the power distribution system, that are in particular useful for mobile lighting devices, the power interface and the second power interface comprise USB interfaces, preferably in the form of USB Type C connector units. The energy-transfer means comprises a USB Type C cable with two USB Type C connectors for connecting to the respective USB Type C connector units.

According to a third aspect of the invention, a method for controlling operation of a lighting device of the first aspect of the invention or one of its embodiments is provided. In other words, the lighting device whose operation is controlled by the method has a light source configured to be driven by electrical power, a power interface for energy transfer with an external electrically driven device that can be connected to the power interface, an energy-storage unit configured to store electrical energy and to deliver the electrical power to the light source and to the power interface to allow, in a connected state of the power interface, an energy-transfer operation between the energy-storage unit and an external second energy-storage unit of an external electrically driven device. The method of the third aspect comprises:
 determining if the power interface is in the connected state;
 determining a current output light-output state of the lighting device; and
 controlling, in the connected state, the energy-transfer operation in an energy-transfer direction depending on the current light-output state of the lighting device.

The method of the third aspect shares the advantages of the lighting device of the first aspect of the present invention or of a respective one of its embodiments.

Some embodiments of the method further comprise:
 determining an energy-storage level indicative of an amount of electrical energy stored in the energy-storage unit; and
 controlling, in the connected state, the energy-transfer operation in additional dependence on the energy-storage level.

In other embodiments of the method, determining the light-output states comprises:
 determining the current output state of the lighting device as one of an off-state, where no electrical power is delivered from the energy-storage unit to the light source, and an on-state, where the light source is driven using the energy stored in the energy-storage unit; or
 determining a current light intensity of the light source of the lighting device; or
 determining a current light-color of the light source of the lighting device.

In yet other embodiments, the method further comprises controlling the light source to provide an output indicative of the current energy-transfer direction.

According to a forth aspect, a computer program for controlling the operation of a lighting device is provided, the computer program comprising executable code for executing a method according to the third aspect or one of its embodiments when executed by a processor of a computer. As with the method of the third aspect, the computer program shares the advantages of the lighting device of the first aspect or of any of its embodiments.

It shall be understood that the lighting device of claim 1, the power distribution system of claim 9, the method for controlling the operation of a lighting device of claim 11, and the computer program of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
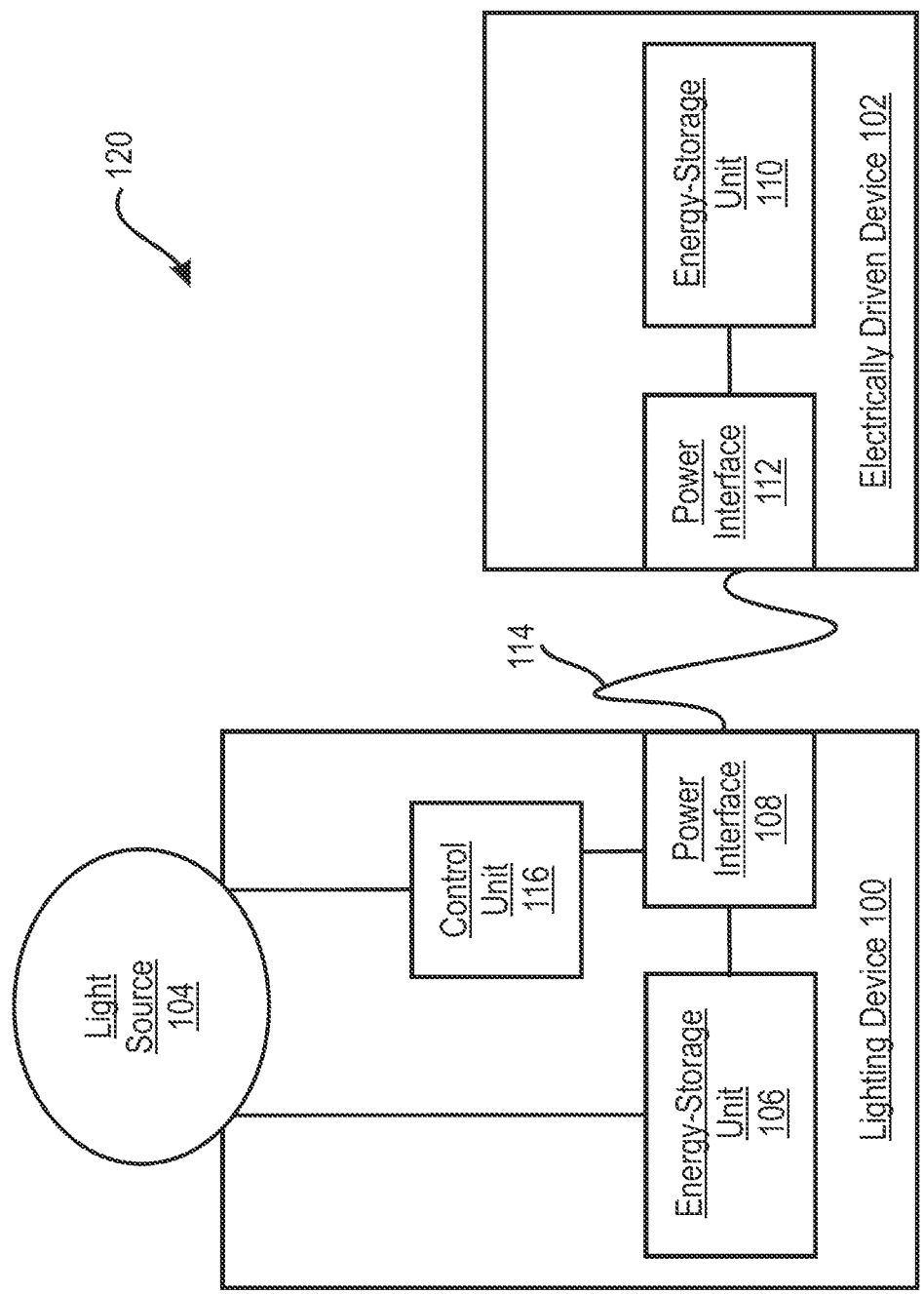
FIG. 1 shows a block diagram representing an embodiment of a power distribution system comprising a first embodiment of a lighting device connected to an external electrically driven device.

FIG. 1 shows a block diagram representing an embodiment of power distribution system 120 that comprises an embodiment of a lighting device 100 connected to an electrically driven device 102 that with reference to the lighting device 100 forms an external device.

The lighting device 100 comprises a light source 104 that is configured to be driven by electrical power. The light source 104 is in the present embodiment a lighting unit made of a plurality of lighting elements, such as light emitting diodes, laser diodes or other electrically driven lighting elements. In accordance with the present invention, the lighting device 100, in addition to its lighting function, supports a bi-directional energy-transfer operation for power distribution in the power distribution system 120. To this end, the lighting device 100 also comprises an energy-storage unit 106 that is configured to store electrical energy and to deliver electrical power to the light source for driving the lighting function and to a power interface 108 for transfer of stored energy to the electrically driven device 102. The energy-storage unit 106 comprises one or more rechargeable batteries or capacitors.

The power interface 108 of the lighting device 100 is configured to allow an energy-transfer operation between the energy-storage unit 106 and a second energy-storage unit 110 of the electrically driven device 102, when they are connected to each other via the power interface 108, an energy-transfer means 114 and a second power interface 112 of the electrically driven device. The energy-transfer means 114 for connecting the power interfaces 108 and 112 suitably is an electrical connector or a cable suitable to carry a charging current between the devices 100 and 102.

The lighting device 100 further comprises a control unit 116 for controlling the energy-transfer operation between the lighting device 100 and the electrically driven device 102. In particular, the control unit 116 is configured to determine if the power interface 108 is in a connected state. The control unit is for instance configured to mechanically or electrically detect the electrical connection to the electrically driven device via the power interface. An electrical detection can be performed by applying an electrical test signal to one or more interface ports of the power-interface 108 and to determine from a received response to the test signal whether or not an electrical connection to the electrically driven device 102 is established.

The electrically driven device 102 is for instance a mobile computing device, such as a Smartphone, or a mobile energy-storage device, or another lighting device. The electrically driven device 102 also has an energy-storage unit 110 where energy can be stored for provision as electrical energy when needed. The electrically driven device 102 can be a further copy of the lighting device 100. However, this is not a requirement. It is sufficient that only one of the devices connected with each other has the control unit 116. Thus, the electrically driven device 102 can be made with a somewhat simpler control unit for operational control because control of the energy-transfer operation can be achieved using only the control unit 116 of the lighting device 100.

The control unit 116 of the lighting device 10 is configured to determine a current light-output state of the lightning device 100, and to control, in the connected state, the energy-transfer operation in an energy-transfer direction depending on the current light-output state of the lighting device 100.

In particular, the control unit 116 is configured to determine the current light-output state of the lighting device 100 as one of an off-state and an on-state. In the off-state no electrical power is delivered from the energy-storage unit 106 to the light source 104 and thus no light is emitted from the light source 104. In the on-state, the light source 104 is driven to emit light using the energy stored in the energy-storage unit 106. The control unit 116 comprises a power delivery detector (not shown) configured to detect the on-state by detecting a delivery of electrical power from the energy-storage unit to the light source. A simple example of a power delivery detector determines a switching state of a power switch (not shown) of the lighting device 100 for turning power delivery from the energy-storage unit 106 to the light source 104 on or off. Different types of such power switches can be used in this context, either suitable for user operation, or for internal automatic control, or for allowing both, user operation and automatic control.

The control unit 116 is also configured to set a first energy-transfer direction, which corresponds to a provision of energy from the energy-storage unit 106 to the second energy-storage unit 110, in case the current light-output state is the on-state, and to set a second energy-transfer direction, which corresponds to a provision of energy from the second energy-storage unit 110 to the energy-storage unit 106, in case the current output state is the off-state.

The lighting device 100 is thus advantageously configured to deliver electrical energy to the electrically driven device 102 when the control unit 116 determines that the light-output state of the lighting device is the on-state (i.e. the light source is being driven) and the power interface 108 is in a connected state. On the other hand, when the control unit 116 determines that the light-output state of the lighting device is the off-state (i.e. the light source is not being driven) and the power interface 108 is in a connected state, the control unit 116 switches to charging the energy-storage unit 106 using electrical energy provided from the electrically driven device 102 via the power interface 108.

A variant of the lighting device 100 operates in an opposite control mode. It is configured to deliver electrical energy to the electrically driven device 102 when the control unit 116 determines that the light-output state of the lighting device is the off-state, and to charge the energy-storage unit 106 using electrical energy provided from the electrically driven device 102 when the control unit 116 determines that the light-output state of the lighting device 100 is the on-state.

In a further variant of the lighting device 100 the control unit 116 is additionally configured to determine an energy-storage level that is indicative of an amount of energy stored in the energy-storage unit 106. The control unit is further configured to control, in the connected state, the energy-transfer operation in additional dependence on the energy-storage level. This control unit 116 of the lighting device advantageously controls the energy-transfer operation not only in dependence on the current light-output state, but also in dependence on the energy-storage level. For instance and as a non-limiting example, a lighting device can be configured to transfer energy from the energy-storage unit 106 to the second energy-storage unit 110 of the electrically driven device 102 when the lighting device is in an on-state and the power interface 108 is in a connected state, as long as the energy-storage level, which is determined by the control unit, is above a preset threshold value such as, for example 25% of the maximum storage capacity of the energy-storage unit 106. If the energy-storage level is found to be below the preset threshold value, the control unit 116 controls the energy-transfer direction so that the energy-storage unit 106 is charged by electrically driven device 102. The default operational mode with respect to charging is thus an input mode and output mode will not be provided as long as the energy-storage level is below the energy-level threshold, irrespective of the light-output state.

Other combinations of light-output states and energy-storage levels can be used to determine the direction of energy transfer.

In other lighting devices, the control unit 116 is also configured to control the light source 104 or an indicator light to provide an output indicative of the current energy-transfer direction. One non-limiting possibility is that when the lighting device 100 currently provides energy to the electrically driven device 102, the light source 104 or the indicator light blinks with a certain frequency. When the lighting device 100 receives energy, it blinks slower.

The control unit 116 can also use the light source or an indicator light to adapt a light output color or color temperature in response to a detected energy-storage level, for instance as the energy-storage level of the energy-storage unit of the lighting device 100 goes from empty to full.

The energy-transfer means 114 comprises in some power distribution systems a set of electrical conductors having one connector at each respective end, and wherein the energy-transfer direction is not per-se predefined by the connectors or the electrical conductors. A particular advantageous example of such energy-transfer means is a USB Type C cable, such as a USB-C patch cable having two USB Type C connectors (not shown). In this example, the power interface of the lighting device and the second power interface of the electrically driven device comprise a USB Type C connector unit respectively. The power interface 108 in the form of a USB-C female jack can be integrated in the lighting device 100, and equally so in diverse types of the electrically driven device 102, like chargers, battery packs, mobile devices, laptops, monitors, smart phones and docking stations. USB Type C connectors support an energy transfer with up to 100 W. The USB voltage is set during a negotiation phase which starts at the beginning of the time of connection. Each connected device advertises available voltage and power levels respectively, and asks for certain voltage and power.

Using USB Type C connectors is also beneficial because the connectors are not only small and support up to USB3.1 data transfer speed, but are also very rugged. The connectors are symmetrical so that they fit in either direction. In comparison, early USB connections were typically unidirectional with a clear host and slave side. That also meant in USB charging applications at the moment of connection it was clear in which direction charging currents would be flowing.

Other energy transfer means configured to electrically connect to the power interface of the lighting device and to the second power interface of the electrically driven device comprise two barrel connectors and a patch cable. Barrel connectors are typically applied to power or charge appliances where no data connection is required and are typically provided with three poles: a ground pole at an outer position, a voltage pole at an inner position and a signaling pole at a center position. Some lighting devices according to the present invention are advantageously configured to use the signaling poles and a corresponding signaling line of the patch to signal the energy transfer direction.

Thus, the lighting device 100 is particularly advantageous in that it allows an easy-to-master power distribution in situations where a main grid for power distribution is not available or unreliable. Here, the lighting device 100 allows for charging the internal energy-storage unit 106 through the power interface 108, as well as forwarding some energy to charge another appliance in the form of the electrically driven device 102 via the power interface 108. Such a lighting device, for instance in the form of a solar-panel based lamp, does not even require a user interface component such as a button, but allows automatic control of the energy-transfer direction, i.e., whether the lighting device is charging or being charged, when it is connected over the bi-directional power interface 108 with the electrically driven device 102. This allows providing the lighting device at very low cost.

Figure 2:
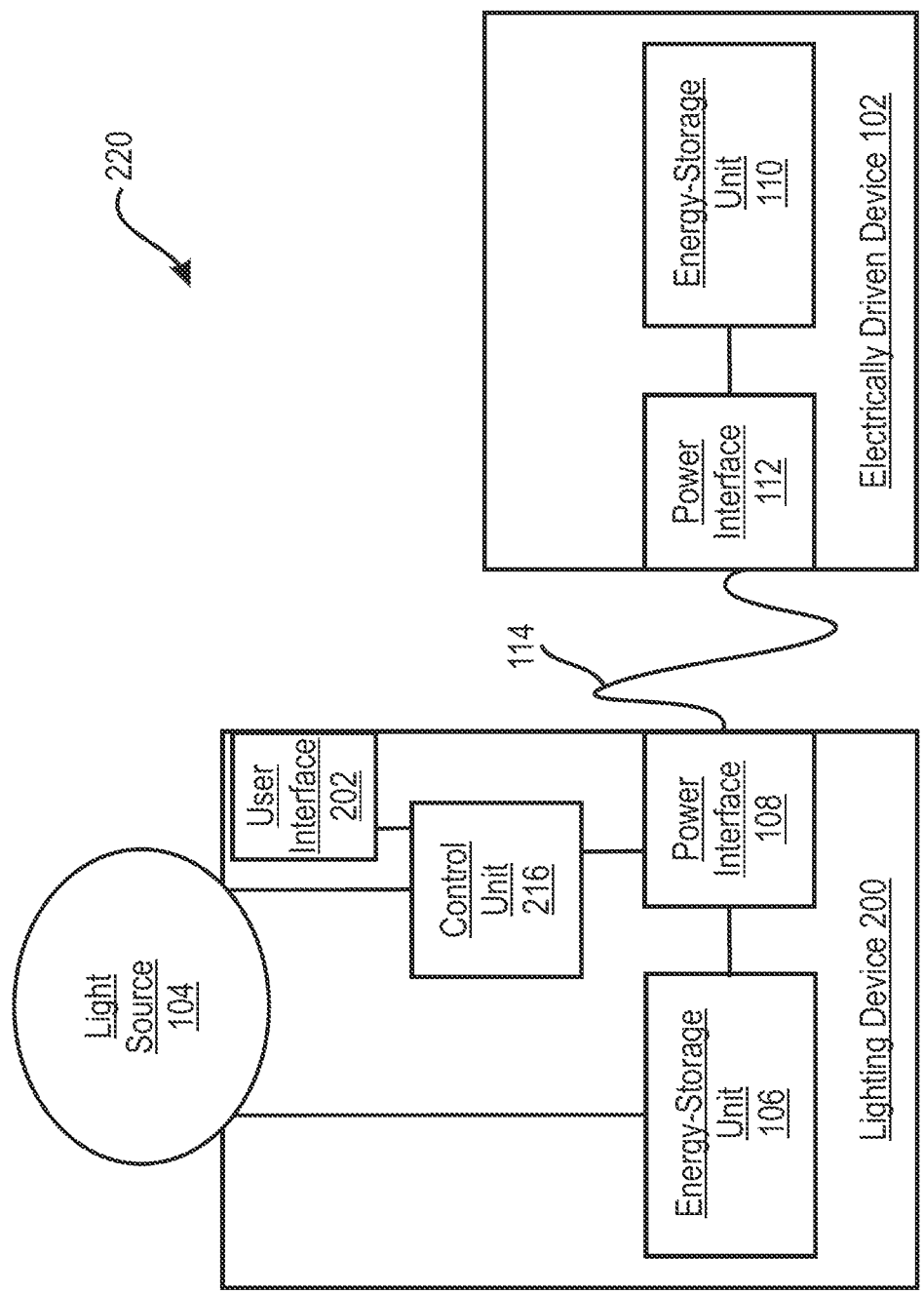
FIG. 2 shows a block diagram representing another embodiment of a power distribution system comprising a second embodiment of a lighting device connected to an external electrically driven device.

FIG. 2 shows a block diagram representing another embodiment of a lighting device 200 connected to an electrically driven device 102 via an energy-transfer means 114. The lighting device 200, the electrically driven device 102 and the energy-transfer means 114 form an exemplary power distribution system 220 according to the present invention.

The lighting device 200 shares several features with the lighting device 100 discussed with reference to FIG. 1 and thus share the same reference signs. In the following discussion, special emphasis will be put on the features distinguishing the lighting device 200 from the lighting device 100.

While certain variants of the embodiment of FIG. 1, like for instance the solar-panel based lamps, do not require a user interface component, the present embodiment however, does have a user interface 202. The control unit 216 of the lighting device 200 is additionally connected to the user interface 202. The user interface 202 is configured to receive user input and to provide a user input signal indicative thereof to the control unit 216. The control unit 216 then controls, in the connected state, the energy-transfer operation between the energy-storage unit 106 of the lighting device 200 and the second energy-storage unit 110 of the electrically driven device 102 in additional dependence on the received user input.

Via input at the user interface, the user of the lighting device 200 may thus externally control the energy-transfer operation. The control unit 216 then determines the energy-transfer direction depending on a combination of the light-output state and the user input signal. Additional advantages can be achieved if the lighting device 200 has the control unit 216 determining the energy-transfer direction in further dependence on the energy-storage level.

The user interface 202 is for instance a switch, a button, or a button panel that can be operated by the user and that is configured to pre-select a desired energy-transfer direction, thus an output mode for providing energy from the lighting device 200 to the electrically driven device 102, or an input mode for receiving energy from the electrically driven device 102 at the lighting device 100. In some of these devices, the user interface can additionally process a user input indicating that no energy-transfer is desired.

In some lighting devices, the user interface 202 comprises a tilt sensor (not shown) that is configured to generate the user input signal as a tilt signal indicative of a tilting angle of the lighting device 200 with respect to an upright position. The control unit 216 is configured to receive the tilt signal and to start, in the connected state, the energy-transfer operation upon determining that the tilting angle is in a predetermined first angular interval for a predetermined first time span. It is also configured to stop the energy-transfer operation upon determining that the tilting angle is in a predetermined second angular interval different from the first angular interval for a predetermined second time span. The tilting sensor preferably comprises an acceleration sensor, preferably configured to determine tilting with respect to 3 axes.

In these lighting devices the user interface can be gesture-controlled, and the triggering of an energy-transfer operation can be intuitively performed just like a pouring a liquid from one container to another. A user tilting the device causes the tilt sensor (e.g. the acceleration sensor) to provide the tilt signal to the control unit 216. When the control unit determines that the current tilting angle is in predetermined first angular interval, a time measurement is started. If the tilting angle remains within the first angular interval for a predetermined time span, the control unit 216 is configured to start, if also the connected state is detected, the energy-transfer operation.

The first angular interval may for instance cover only tilting angle values ranging from 10° to 30° for triggering a transfer energy from the lighting device 200 to the electrically driven device 102, and only tilting angle values from 45° to 80° for stopping energy transfer in this direction, and/or for triggering a transfer of energy from the electrically driven device 102 to the lighting device. In other embodiments the first and second angular intervals are different.

Merely stopping an ongoing energy-transfer operation can be triggered based on another type of user input. For instance, the control unit stops the energy-transfer operation upon determining that the tilting angle has been in a predetermined second angular interval for a predetermined second time span.

Figure 3:
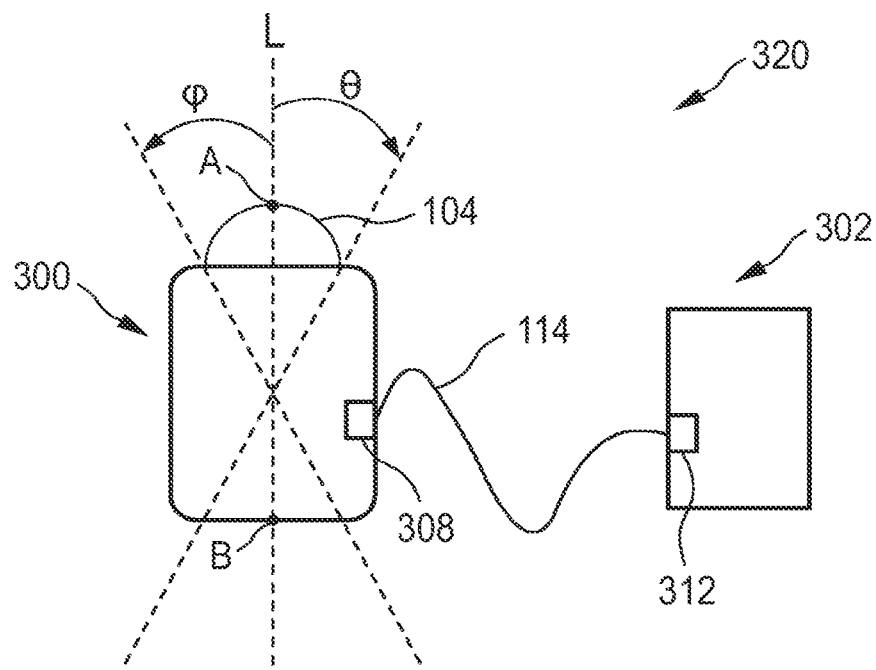
FIG. 3 shows a block diagram representing another embodiment of a power distribution system comprising a third embodiment of a lighting device connected to an external electrically driven device.

FIG. 3 shows a lighting device 300 connected to an electrically driven device 302 via an energy-transfer means 114. The lighting device 300, the electrically driven device 302 and the energy-transfer means 114 form an exemplary power distribution system 320 according to the present invention.

The energy transfer-means is an USB Type C cable that electrically connects the power interface 308 and the second power interface 312. The lighting device 300 is shown in an upright position defined in this case by having the positions A and B on the same vertical axis L. Following the analogy with pouring liquid from one container such as a pitcher with a spout to another container, the power interface 308 may be figuratively considered in lighting device 300 as the "spout" of the lighting device. If the tilt sensor (not shown) detects a tilting towards the power interface 308 (as shown by the arrow) having a tilting angle θ in the predetermined first angular interval for the predetermined first time span (what will be referred to in the following as gesture a), an energy-transfer operation from the lighting device to the electrically driven device is started (in the connected state). Tilting the lighting device in the sample plane but in the other energy-transfer direction (i.e. away from the power interface 308), a tilting angle φ in the predetermined second angular interval for the predetermined second time span (what will be referred to in the following as gesture b) will terminate the energy-transfer operation. In some lighting devices the energy-transfer operation, and the direction, is determined by the control unit depending on the type of gesture (gesture a or gesture b) and on an actual state and direction of the energy-transfer operation. For the sake of clarity, an energy-transfer operation from the lighting device 300 to the electrically driven device 302 will be referred to as having an energy-transfer direction a. Conversely, an energy-transfer operation from the electrically driven device 302 to the lighting device 300 the will referred to as having an energy-transfer direction b. A particular example of the different possibilities and the resulting energy-transfer direction is given in table 1.

TABLE 1

Resulting operation as a function of user input gesture, current state of the energy-transfer operation and current energy-transfer direction (Power interface 308 is in the connected state).

| Unser input | Current state of energy-transfer operation | Current energy-transfer direction | Resulting Operation |
| --- | --- | --- | --- |
| Gesture a | OFF | None | Start transfer in direction a |
| Gesture b | ON | Direction a | Keep transfer in direction b |
| Gesture a | ON | Direction b | Stop transfer |
| Gesture b | OFF | None | Start transfer in direction b |
| Gesture b | ON | Direction a | Stop transfer |
| Gesture b | ON | Direction b | Keep transfer in direction b |

Figure 4:
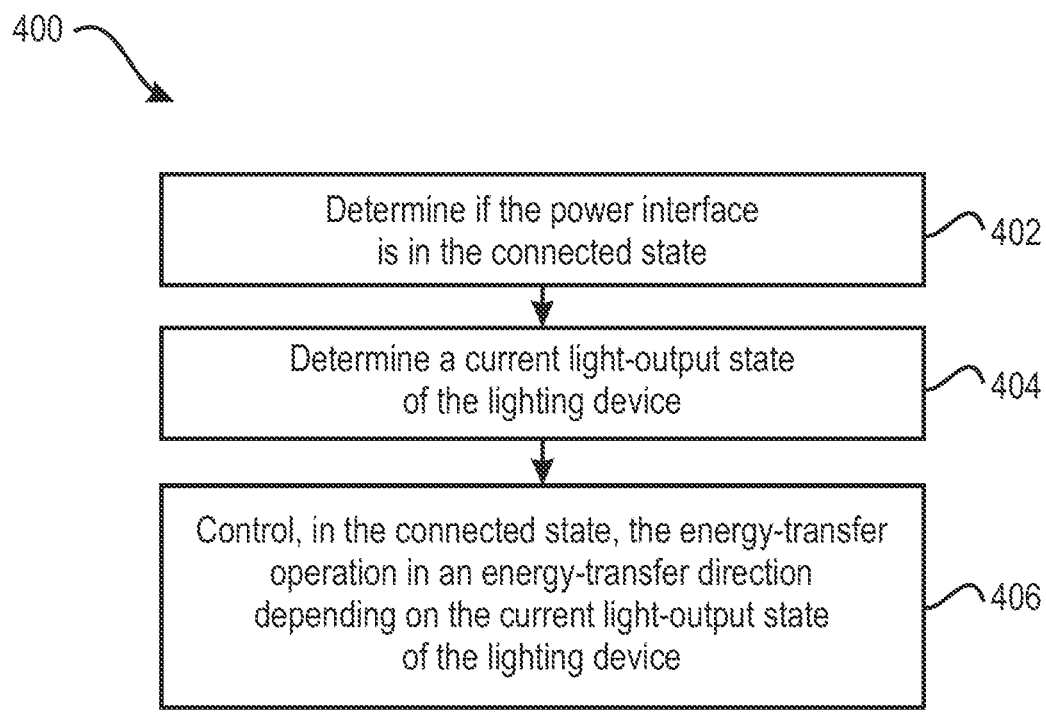
FIG. 4 shows a flow diagram representing an embodiment of a method for controlling operation of a lighting device.

FIG. 4 shows a flow diagram representing an embodiment of a method 400 for controlling operation of a lighting device such as the lighting device 100 described with reference to FIG. 1. The lighting device thus has a light source configured to be driven by electrical power, an energy-storage unit configured to receive electrical power via the power interface, to store received electrical power as electrical energy, and to deliver stored electrical energy to the light source as the electrical power and to the power interface that is configured to allow, in a connected state, an energy-transfer operation between the energy-storage unit and an external second energy-storage unit of an external electrically driven device that can be connected to the power interface. The method 4 determines, in a step 402, if the power interface is in the connected state. It then determines, in a step 404, a current light-output state of the lighting device and then, in a step 406 the method controls, in the connected state, the energy-transfer operation in an energy-transfer direction depending on the current light-output state of the lighting device.

In different examples of method 400, the step 404 of determining the current light-output state of the lighting device involves one of the following steps:
  determining the current output state of the lighting device as one of an off-state, where no electrical power is delivered from the energy-storage unit to the light source, and an on-state, where the light source is driven using the energy stored in the energy-storage unit; or
  determining a current light intensity value of a light source configured to emit light having a controllable light-intensity value; or
  determining a current light-color value using respective current light-intensity values of a plurality of lighting units of a light source, wherein the plurality of lighting units are configured to emit light at a respective different wavelength spectrum and with the respective controllable light-intensity value.

Figure 5:
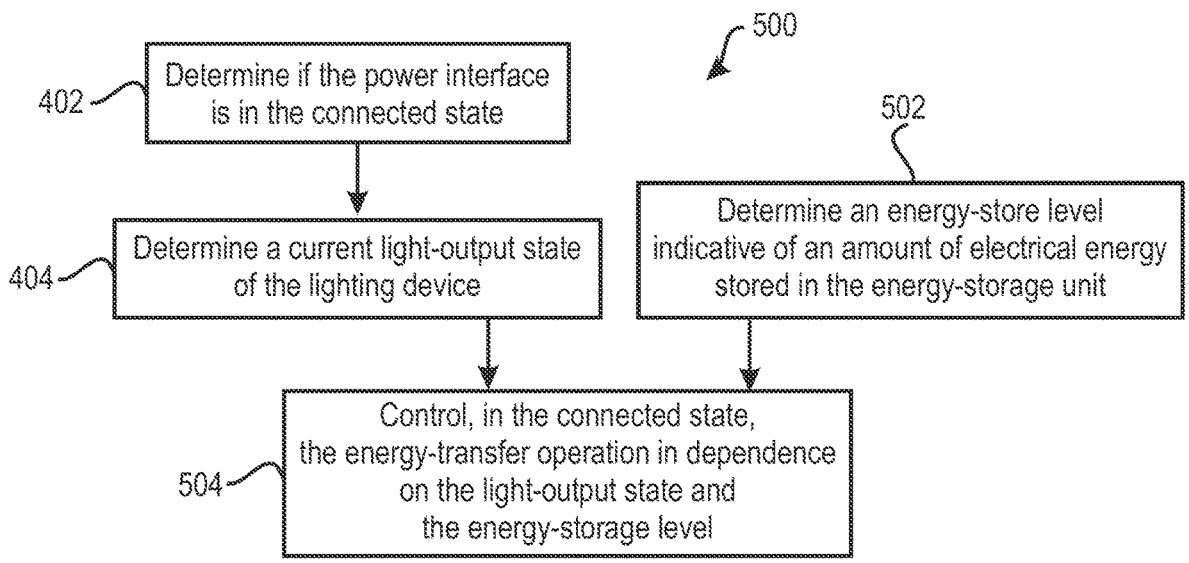
FIG. 5 shows a flow diagram representing another embodiment of a method for controlling operation of a lighting device.

FIG. 5 shows a flow diagram representing another embodiment of a method 500 for controlling operation of a lighting device having a control configured to determine an energy-storage level indicative of an amount of electrical energy stored in the energy-storage unit. The method 500 includes the steps 402 and 404 described with reference to FIG. 4. Additionally, the method 500 determines, in a step 502, an energy-storage level indicative of an amount of electrical energy stored in the energy-storage unit and then, in a step 504 it controls, in the connected state, the energy-transfer operation in dependence on both the light-output state and the energy-storage level.

Figure 6:
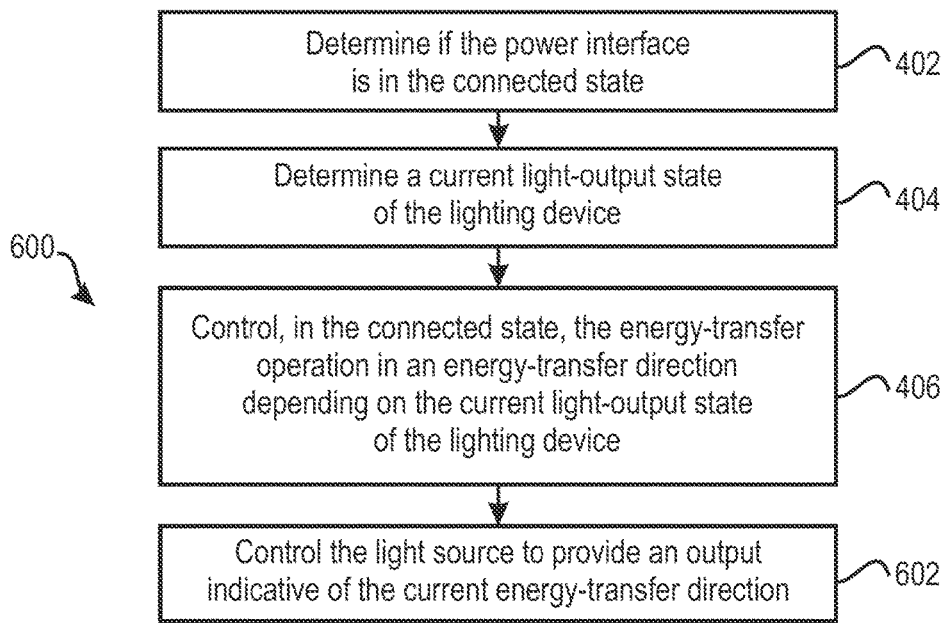
FIG. 6 shows a flow diagram representing another embodiment of a method for controlling operation of a lighting device.

FIG. 6 shows a flow diagram representing another embodiment of a method 600 for controlling operation of a lighting device. The method 600 performs the steps 402, 404 and 406 described with reference to FIG. 4. The method 600 further includes step 602 which involves further comprising controlling the light source to provide an output indicative of the current energy-transfer direction.

In the claims, the word "comprising" does not exclude other elements or steps, and the indefinite article "a" or "an" does not exclude a plurality.

A single step or other units may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A lighting device, comprising:
a light source configured to be driven by electrical power;
a power interface for energy transfer with an external electrically driven device that can be is connected to the power interface;
an energy-storage unit configured to receive electrical power via the power interface, to store the received electrical power as electrical energy, and to deliver the stored electrical energy to the light source as the electrical power, and to allow, when the external electrically driven device is connected to the power interface such that the power interface is in a connected state, an energy-transfer operation between the energy-storage unit and an external second energy-storage unit of the external electrically driven device in a controllable energy-transfer direction via the power interface; and
a control unit configured to:
determine if the power interface is in the connected state;
determine a current light-output state of the lighting device; wherein the current light-output state of the lighting device is an operational state of the light source of the lighting device; and
control, in the connected state, the energy-transfer direction of the energy-transfer operation in dependence on the current light-output state of the lighting device.

2. The lighting device of claim 1, wherein the control unit is configured to determine an energy-storage level indicative of an amount of electrical energy stored in the energy-storage unit, and to control, in the connected state, the energy-transfer operation in additional dependence on the energy-storage level.

3. The lighting device of claim 1, further comprising a user interface configured to receive user input and to provide a user input signal indicative thereof, wherein the control unit is further configured to receive the user input signal and to control, in the connected state, the energy-transfer operation in additional dependence on the received user input signal.

4. The lighting device of claim 3, wherein:
the user interface comprises a tilt sensor that is configured to generate the user input signal as a tilt signal indicative of a tilting angle of the lighting device with respect to a predetermined upright position; and wherein the control unit is configured receive the tilt signal and to start, in the connected state, the energy-transfer operation upon determining that the tilting angle is in a predetermined first angular interval for a predetermined first time span, and to stop the energy-transfer operation upon determining that the tilting angle is in a predetermined second angular interval for a predetermined second time span.

5. The lighting device of claim 1, wherein the control unit is configured:
to determine the current light-output state of the lighting device as one of an off-state, where no electrical power is delivered from the energy-storage unit to the light source, and an on-state, where the light source is driven using the energy stored in the energy-storage unit; and
to set a first energy-transfer direction from the energy-storage unit to the second energy-storage unit in case the current output state is the on-state, and to set a second energy-transfer direction from the second energy-storage unit to the energy-storage unit in case the current output state is the off-state.

6. The lighting device of claim 1, wherein:
the light source is configured to emit light with a controllable light-intensity; and wherein
the control unit is further configured to determine a current light-intensity value as the light-output state, to set a first energy-transfer direction from the energy-storage unit to the second energy-storage unit in case the current light-intensity value is within a predetermined first light-intensity interval, and to set a second energy-transfer direction from the second energy-storage unit to the energy-storage unit in case the current light-intensity value is within a predetermined second light-intensity interval that is different from the first light-intensity interval.

7. The lighting device of claim 1, wherein:
the light source comprises a plurality of lighting elements that are configured to emit light with respective different wavelength spectra and with respective controllable light-intensities; and wherein
the control unit is configured to determine a current light-color value as the light-output state, using respective current light-intensity values of the plurality of lighting elements, and to set, in the connected state, the energy-transfer direction in dependence on the current light-color value.

8. The lighting device of claim 1, wherein the control unit is further configured to control the light source to provide an output indicative of the current energy-transfer direction.

9. A power distribution system, comprising:
a lighting device according to claim 1;
an electrically driven device, comprising:
a second power interface configured to be connected to the power interface of the lighting device;
a second energy-storage unit connected to the second power interface and configured to store electrical energy and to deliver electrical power to the lighting device and receive electrical power from the lighting device; wherein the electrically driven device is defined as the external electrically driven device, and the second energy-storage unit is defined as the external second energy-storage unit; and an energy-transfer connector or cable configured to electrically connect to the power interface of the lighting device and to the second power interface of the electrically driven device to enable the energy-transfer operation between the energy-storage unit of the lighting device and the second energy-storage unit of the electrically driven device.

10. The power distribution system of claim 9, wherein the power interface and the second power interface are USB Type C connector units and wherein the energy-transfer connector or cable comprises a USB Type C cable and two USB Type C connectors configured to connect to the respective USB Type C connector units.

11. A method for controlling operation of a lighting device having a light source, the method comprising:
   determining if a power interface of an external electrically driven device is in a connected state, wherein the connected state occurs when the external electrically driven device is connected to the power interface;
   determining a current light-output state of the lighting device; wherein the current light-output state of the lighting device is an operational state of the light source of the lighting device; and
   controlling, in the connected state, an energy-transfer operation between a first energy-storage unit and an external second energy-storage unit of the external electrically drive device in an energy-transfer direction depending on the current light-output state of the lighting device.

12. The method of claim 11, further comprising:
   determining an energy-storage level indicative of an amount of electrical energy stored in the energy-storage unit;
   controlling, in the connected state, the energy-transfer operation in additional dependence on the energy-storage level.

13. The method of claim 11, wherein determining the light-output states comprises:
   determining the current output state of the lighting device as one of an off-state, where no electrical power is delivered from the energy-storage unit to the light source, and an on-state, where the light source is driven using the energy stored in the energy-storage unit; or
   determining a current light intensity of the light source of the lighting device; or
   determining a current light-color of the light source of the lighting device.

14. The method of claim 11, further comprising controlling the light source to provide an output indicative of the current energy-transfer direction.

15. A non-transitory computer readable medium having computer executable instructions stored thereupon, that, when executed by at least one processor, causes the at least one processor to perform operations, comprising:
   determining if a power interface of an external electrically driven device is in a connected state, wherein the power interface is configured for energy transfer between a light source of a lighting device and an external electrically driven device that is connected to the power interface;
   determining a current light-output state of the lighting device, wherein the current light-output state of the lighting device is an operational state of the light source of the lighting device; and
   controlling, in the connected state, an energy transfer operation between a first energy-storage unit and an external second energy-storage unit of the external electrically driven device in an energy-transfer direction depending on the current light-output state of the lighting device.

* * * * *